(12) United States Patent
Uranishi et al.

(10) Patent No.: US 12,432,468 B2
(45) Date of Patent: Sep. 30, 2025

(54) PROCESSING DEVICE, IMAGING APPARATUS, PROCESSING METHOD, AND PROCESSING PROGRAM

(71) Applicant: FUJIFILM Corporation, Tokyo (JP)

(72) Inventors: Taiju Uranishi, Saitama (JP); Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 293 days.

(21) Appl. No.: 18/179,887

(22) Filed: Mar. 7, 2023

(65) Prior Publication Data

US 2023/0319433 A1 Oct. 5, 2023

(30) Foreign Application Priority Data

Mar. 30, 2022 (JP) ................. 2022-057499

(51) Int. Cl.
*H04N 25/63* (2023.01)
*H04N 25/772* (2023.01)

(52) U.S. Cl.
CPC .......... *H04N 25/63* (2023.01); *H04N 25/772* (2023.01)

(58) Field of Classification Search
None
See application file for complete search history.

(56) References Cited

U.S. PATENT DOCUMENTS

| | | |
|---|---|---|
| 2013/0147979 A1* | 6/2013 | McMahon ............. H04N 25/00 348/218.1 |
| 2020/0228743 A1* | 7/2020 | Uchida ................... H04N 25/79 |
| 2021/0021770 A1* | 1/2021 | Nakazawa ............ H10F 39/802 |
| 2021/0329184 A1* | 10/2021 | Watanabe ............. H04N 5/911 |

FOREIGN PATENT DOCUMENTS

| | | |
|---|---|---|
| JP | 2007-336343 A | 12/2007 |
| JP | 2015-080114 A | 4/2015 |

* cited by examiner

*Primary Examiner* — Mark T Monk
(74) *Attorney, Agent, or Firm* — Studebaker Brackett PLLC

(57) ABSTRACT

A processing device includes: a processor that processes an imaging signal output from an imaging element which includes a peripheral circuit and a pixel unit in which a pixel which converts light into an electric signal and outputs the electric signal is arranged; and a memory, and the processor is configured to: correct the imaging signal based on an operation state of the peripheral circuit.

17 Claims, 11 Drawing Sheets

PROCESSING DEVICE, IMAGING APPARATUS, PROCESSING METHOD, AND PROCESSING PROGRAM

CROSS-REFERENCE TO RELATED APPLICATIONS

The present application claims priority under 35 U.S.C. § 119 to Japanese Patent Application No. 2022-057499, filed on Mar. 30, 2022. The above application is hereby expressly incorporated by reference, in its entirety, into the present application.

BACKGROUND OF THE INVENTION

1. Field of the Invention

The present invention relates to a processing device, an imaging apparatus, a processing method, and a computer readable medium storing a processing program.

2. Description of the Related Art

JP2007-336343A discloses an image data correction device including an imaging element having an open pixel region and a light-shielded pixel region, a readout unit that reads out the pixel data from the imaging element, a calculation unit that, from pixel data read out from the light-shielded pixel region of the imaging element by the readout unit, calculates one-dimensional dark shading correction data corresponding to each column of the pixel data, and a correction unit that, in reading out the pixel data from the open pixel region of the imaging element via the readout unit, corrects one-dimensional dark shading of the imaging element using the one-dimensional dark shading correction data calculated by the calculation unit.

JP2015-080114A discloses an imaging apparatus comprising a pixel unit that includes a plurality of photoelectric conversion elements in one microlens and that includes a transmission unit for each photoelectric conversion element, a row scanning circuit for, in order to transmit data of pixels of one row, selecting the one row, a column scanning circuit for reading out, for each column, the data of the one row read out by the row scanning circuit, a thinning-out control circuit that controls a thinning-out rate of the readout of the column scanning circuit, a correction value generation unit that generates a correction value of dark shading based on the readout data, a storage unit that stores the generated correction value, and a correction unit that corrects a signal of a pixel based on the generated correction value, in which in reading out data of a part of the photoelectric conversion elements corresponding to one microlens, the correction value generation unit generates the correction value corresponding to the thinning-out rate of the readout from the data that is read out with a small thinning-out amount or without thinning out.

SUMMARY OF THE INVENTION

A processing device according to one embodiment of the disclosed technology comprises a processor that processes an imaging signal output from an imaging element which includes a pixel unit in which a pixel which converts light into an electric signal and which outputs the electric signal is arranged, and which includes a peripheral circuit, and a memory, in which the processor is configured to correct the imaging signal based on an operation state of the peripheral circuit.

An imaging apparatus according to another embodiment of the disclosed technology comprises the processing device and the imaging element.

A processing method according to still another embodiment of the disclosed technology is a processing method for processing an imaging signal output from an imaging element which includes a pixel unit in which a pixel which converts light into an electric signal and which outputs the electric signal is arranged, and which includes a peripheral circuit, the processing method comprising correcting the imaging signal based on an operation state of the peripheral circuit.

A processing program stored in a computer readable medium according to still another embodiment of the disclosed technology is a processing program for processing an imaging signal output from an imaging element which includes a pixel unit in which a pixel which converts light into an electric signal and which outputs the electric signal is arranged, and which includes a peripheral circuit, the processing program causing a processor to execute correcting the imaging signal based on an operation state of the peripheral circuit.

DESCRIPTION OF THE PREFERRED EMBODIMENTS

Figure 1:
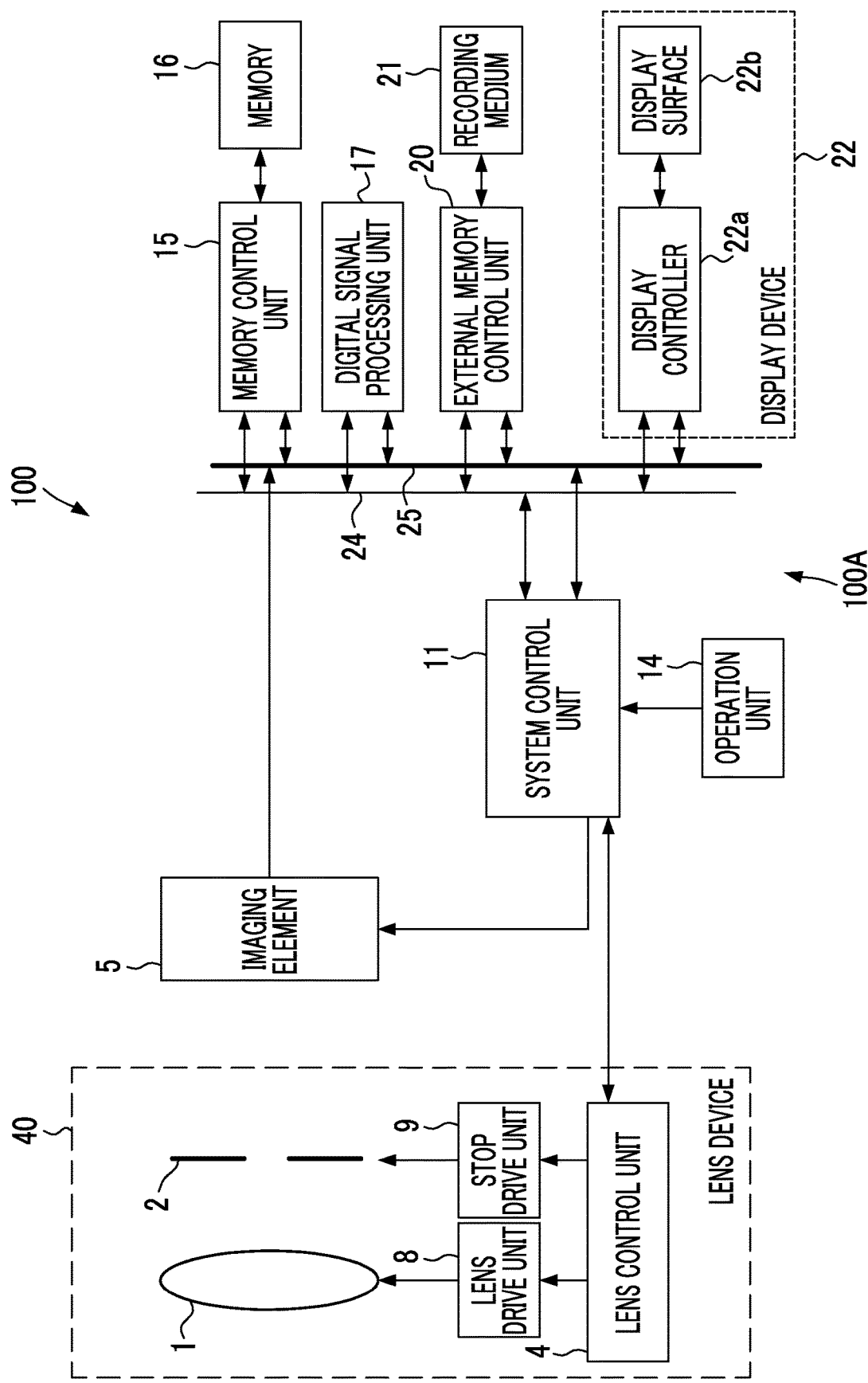
FIG. 1 is a diagram illustrating a schematic configuration of a digital camera 100 that is one embodiment of an imaging apparatus according to the present invention.

FIG. 1 is a diagram illustrating a schematic configuration of a digital camera 100 that is one embodiment of an imaging apparatus according to the present invention.

The digital camera 100 illustrated in FIG. 1 comprises a lens device 40 that includes an imaging lens 1, a stop 2, a lens control unit 4, a lens drive unit 8, and a stop drive unit 9; and a main body unit 100A. The main body unit 100A comprises an imaging element 5, a system control unit 11, an operation unit 14, a display device 22, a memory 16 including a random access memory (RAM), a read only memory (ROM), and the like, a memory control unit 15 that controls data recording in the memory 16 and data readout from the memory 16, a digital signal processing unit 17, and an external memory control unit 20 that controls data recording on a recording medium 21 and data readout from the recording medium 21. A processing device is configured with the system control unit 11 and the memory 16.

The lens device 40 may be attachable and detachable with respect to the main body unit 100A or may be integrated with the main body unit 100A. The imaging lens 1 includes a focus lens or the like that can be moved in an optical axis direction.

The lens control unit 4 of the lens device 40 is configured to be capable of communicating with the system control unit 11 of the main body unit 100A in a wired or wireless manner. In accordance with an instruction from the system control unit 11, the lens control unit 4 changes a position of a principal point of the focus lens by controlling the focus lens included in the imaging lens 1 via the lens drive unit 8 or controls an F number of the stop 2 via the stop drive unit 9.

The imaging element 5 includes an imaging surface on which a plurality of pixels are two-dimensionally arranged, converts a subject image formed on the imaging surface by an imaging optical system into pixel signals via the plurality of pixels, and outputs the pixel signals. A complementary metal-oxide semiconductor (CMOS) image sensor is suitably used as the imaging element 5. Hereinafter, the imaging element 5 will be described as a CMOS image sensor. A set of the pixel signals output from the imaging element 5 will be referred to as an imaging signal.

The system control unit 11 that manages and controls the entire electric control system of the digital camera 100 drives the imaging element 5 to output the subject image captured through the imaging optical system of the lens device 40 as the imaging signal.

A command signal from a user is input into the system control unit 11 through the operation unit 14. The operation unit 14 includes a touch panel integrated with a display surface 22*b*, and various buttons and the like.

The system control unit 11 manages and controls the entire digital camera 100 and has a hardware structure of various processors that perform processing by executing programs including a processing program. The programs executed by the system control unit 11 are stored in the ROM of the memory 16.

Examples of the various processors include a central processing unit (CPU) that is a general-purpose processor performing various types of processing by executing a program, a programmable logic device (PLD) such as a field programmable gate array (FPGA) that is a processor of which a circuit configuration can be changed after manufacture, or a dedicated electric circuit such as an application specific integrated circuit (ASIC) that is a processor having a circuit configuration dedicatedly designed to execute specific processing. More specifically, the structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

The display device 22 comprises the display surface 22*b* configured with an organic electroluminescence (EL) panel, a liquid crystal panel, or the like, and a display controller 22*a* that controls display on the display surface 22*b*.

The memory control unit 15, the digital signal processing unit 17, the external memory control unit 20, and the display controller 22*a* are connected to each other through a control bus 24 and a data bus 25 and are controlled by instructions from the system control unit 11.

Figure 2:
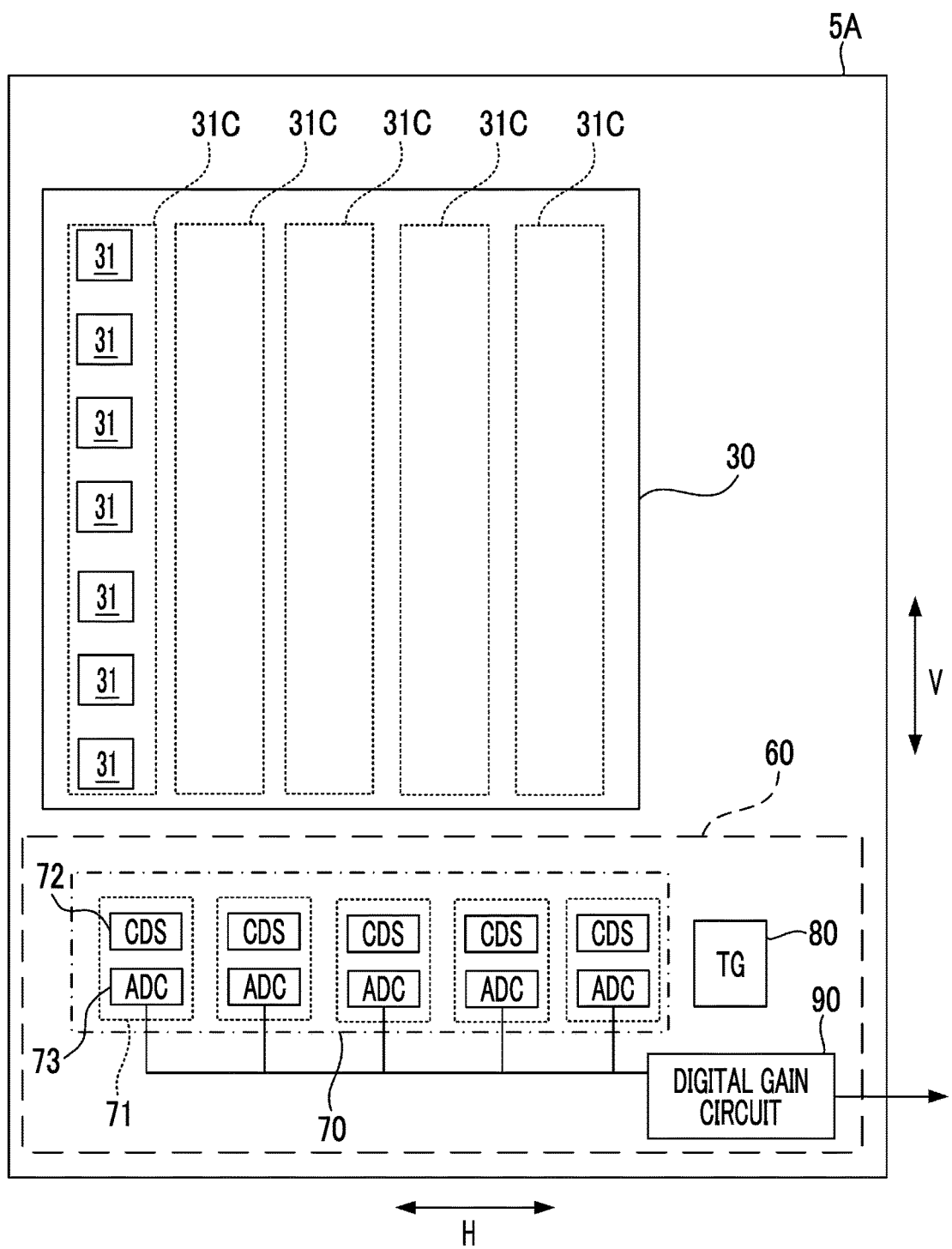
FIG. 2 is a schematic diagram illustrating a schematic configuration of an imaging element 5A.

Next, configuration examples of the imaging element 5 will be described. The configuration examples of the imaging element 5 include an imaging element 5A, an imaging element 5B, an imaging element 5C, and an imaging element 5D described below. FIG. 2 is a schematic diagram illustrating a schematic configuration of the imaging element 5A.

The imaging element 5A illustrated in FIG. 2 comprises a pixel unit 30, a peripheral circuit 60, and a drive circuit, not illustrated, that drives the pixel unit 30.

The pixel unit 30 is a region in which pixels 31 that convert light into electric signals and that output the electric signals are two-dimensionally arranged in a vertical direction (V direction) and in a horizontal direction (H direction) orthogonal to the V direction. In the pixel unit 30, a plurality of pixel columns 31C each consisting of a plurality of the pixels 31 arranged in the V direction are arranged in the H direction. It can also be said that a plurality of pixel rows each being a set of a plurality of the pixels 31 arranged in the H direction are arranged in the V direction in the pixel unit 30.

The peripheral circuit 60 comprises a processing circuit group 70, a timing generator (TG) 80, and a digital gain circuit 90.

The processing circuit group 70 includes a processing circuit 71 that is disposed to correspond to each pixel column 31C of the pixel unit 30. Each processing circuit 71 included in the processing circuit group 70 is arranged in the H direction. The processing circuit 71 comprises a correlated double sampling (CDS) circuit 72 that performs CDS processing on analog pixel signals output from the pixels 31 in the pixel column 31C, and an analog-to-digital converter (ADC) circuit 73 that converts the pixel signals after processing in the CDS circuit 72 into digital signals and that outputs the digital signals.

The digital gain circuit 90 multiplies the pixel signals output from the ADC 73 by a gain corresponding to imaging sensitivity or the like and outputs the pixel signals. The digital signal processing unit 17 processes the pixel signals output from the digital gain circuit 90, thereby generating image data suitable for display or storage.

The TG 80 generates timing signals necessary for operating the drive circuit, the processing circuit 71, and the digital gain circuit 90 included in the imaging element 5A and supplies the timing signals thereto.

The processing circuit group 70 is arranged adjacent to one side (a lower side in FIG. 2) of the pixel unit 30 in the V direction. The TG 80 and the digital gain circuit 90 are arranged near one end of the processing circuit group 70 in the H direction.

Figure 3:
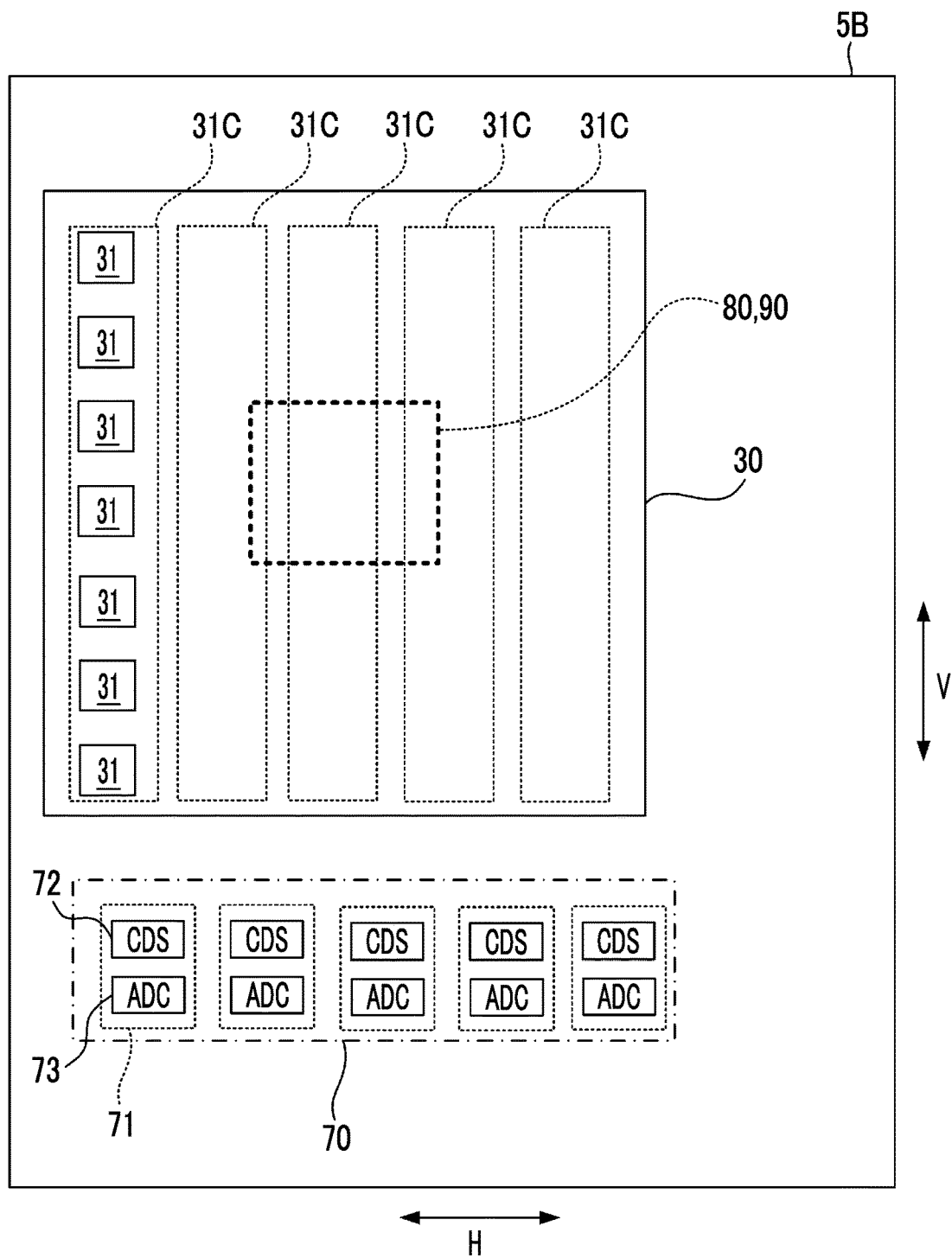
FIG. 3 is a schematic diagram illustrating a schematic configuration of an imaging element 5B.

FIG. 3 is a schematic diagram illustrating a schematic configuration of the imaging element 5B. The imaging element 5B has the same configuration as the imaging element 5A in FIG. 2 except that positions of the TG 80 and the digital gain circuit 90 in the peripheral circuit 60 are changed. In the imaging element 5B, the TG 80 and the digital gain circuit 90 are laminated with the pixel unit 30 in a direction perpendicular to the V direction and to the H direction and are arranged on a rear surface of the pixel unit 30.

Figure 4:
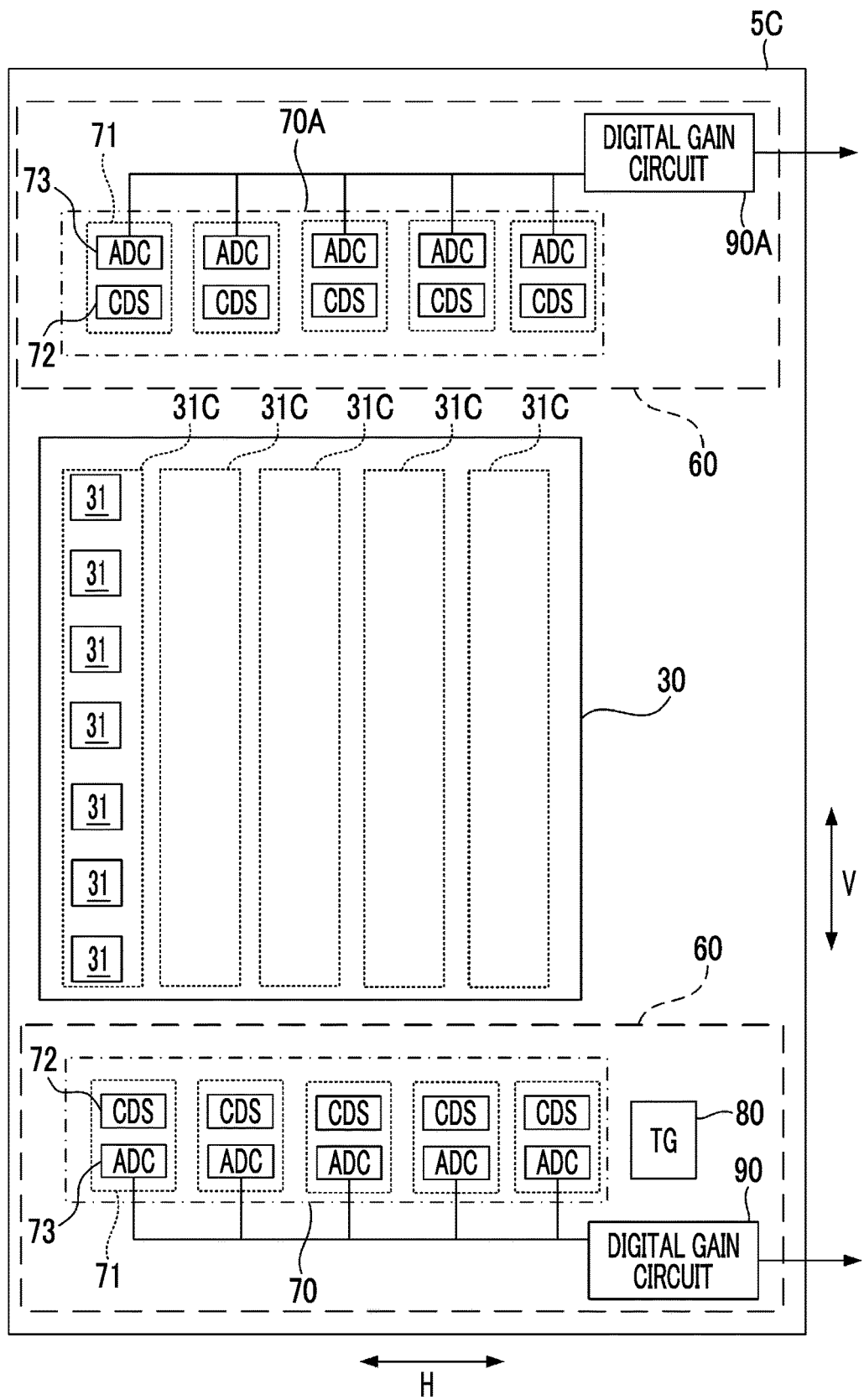
FIG. 4 is a schematic diagram illustrating a schematic configuration of an imaging element 5C.

FIG. 4 is a schematic diagram illustrating a schematic configuration of the imaging element 5C. The imaging element 5C has the same configuration as the imaging element 5A in FIG. 2 except that a processing circuit group 70A and a digital gain circuit 90A are further added as the peripheral circuit 60. The processing circuit group 70A has the same configuration as the processing circuit group 70. The digital gain circuit 90A has the same configuration as the digital gain circuit 90. The processing circuit group 70A and the digital gain circuit 90A are arranged adjacent to the other side of the pixel unit 30 in the V direction. In the configuration of the imaging element 5C, for example, the pixel signals output from half of the pixels 31 included in the pixel column 31C are processed by the processing circuit group 70, and the pixel signals output from the remaining half of the pixels 31 included in the pixel column 31C are processed by the processing circuit group 70A.

Figure 5:
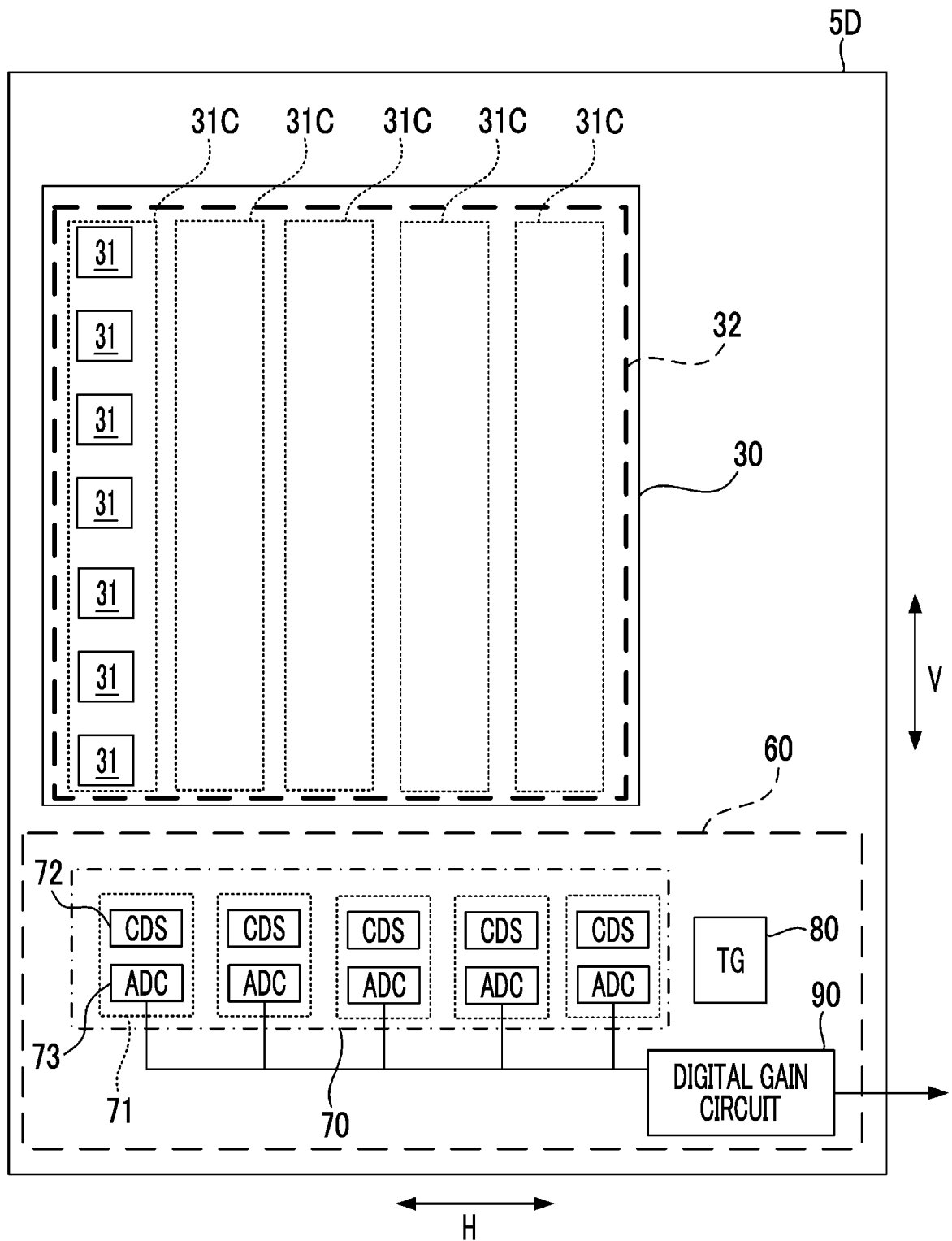
FIG. 5 is a schematic diagram illustrating a schematic configuration of an imaging element 5D.

FIG. 5 is a schematic diagram illustrating a schematic configuration of the imaging element 5D. The imaging element 5B has the same configuration as the imaging element 5A in FIG. 2 except that a storage circuit 32 is added as one constituent of the peripheral circuit 60. The storage circuit 32 includes a storage element that stores the pixel signal output from each pixel 31 of the pixel unit 30. For example, the storage circuit 32 is configured with a dynamic RAM (DRAM). The storage circuit 32 is laminated with the pixel unit 30 in the direction perpendicular to the V direction and to the H direction and is arranged on the rear surface of the pixel unit 30. In the configuration of the imaging element 5D, the pixel signals that are output from the pixels 31 and that are stored in the storage circuit 32 are processed by the processing circuit group 70. In a state where the storage circuit 32 is not in operation, the pixel signals output from the pixels 31 are processed by the processing circuit 71 without passing through the storage circuit 32.

In the imaging element 5A, an effect received from magnetic flux generated in a case where the TG 80 and the digital gain circuit 90 operate is different between the processing circuit 71 arranged near the TG 80 and near the digital gain circuit 90 and the processing circuit 71 arranged away from the TG 80 and from the digital gain circuit 90. Specifically, the processing circuit 71 arranged near the TG 80 and near the digital gain circuit 90 receives a relatively strong effect of the magnetic flux. Thus, relatively strong noise is mixed into signals output from one or both of the CDS circuit 72 and the ADC 73 because of the effect of the magnetic flux. On the other hand, in the processing circuit 71 positioned away from the TG 80 and from the digital gain circuit 90, since the effect of the magnetic flux is low, noise mixed into the signals output from one or both of the CDS circuit 72 and the ADC 73 is weak.

Accordingly, in the imaging element 5A, the pixel signals output from each pixel row in the dark have a higher dark output level as the pixels 31 thereof are positioned closer to the TG 80 and to the digital gain circuit 90, and horizontal shading caused by the magnetic flux occurs.

In the present specification, a ratio of the number of active elements (transistors and the like) in operation to the total number of active elements included in each circuit (the TG 80, the digital gain circuit 90, the processing circuit 71, the storage circuit 32, and the like) included in the peripheral circuit 60 is defined as an activation ratio. The noise that may occur because of the magnetic flux is increased as the activation ratio of each of the TG 80 and the digital gain circuit 90 is increased. That is, in a case where operation states (specifically, the activation ratios) of the TG 80 and the digital gain circuit 90 change, a shape of the horizontal shading also changes.

Figure 6:
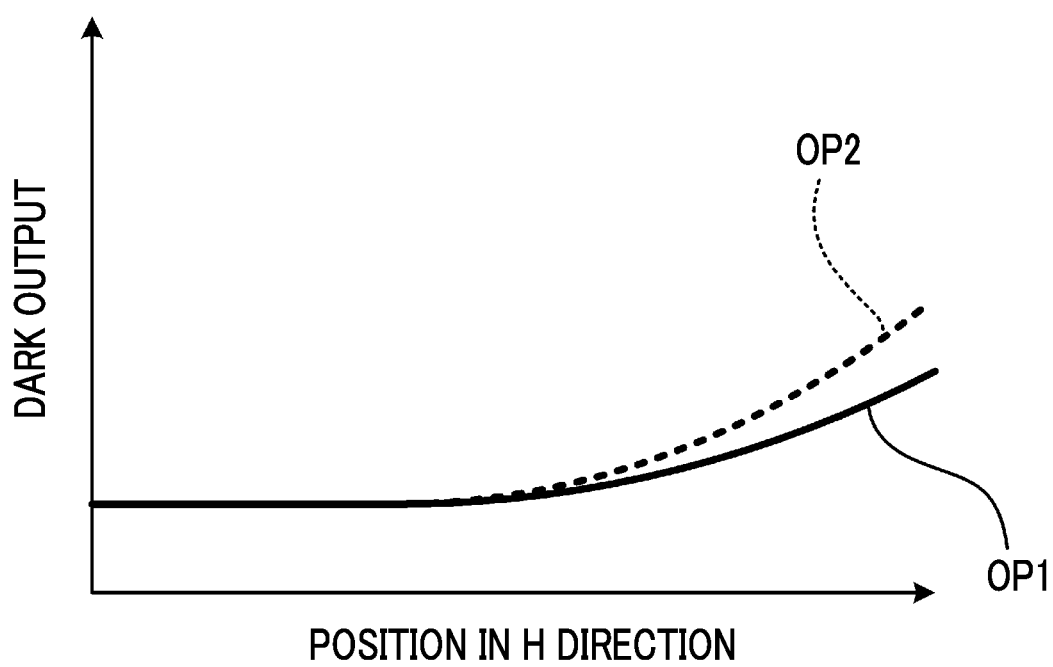
FIG. 6 is a schematic diagram for describing horizontal shading of pixel signals output from a pixel row of the imaging element 5A.

FIG. 6 is a schematic diagram for describing the horizontal shading of the pixel signals output from the pixel row of the imaging element 5A. The horizontal axis in FIG. 6 denotes a position of each pixel 31 of the pixel row in the H direction. The vertical axis in FIG. 6 denotes a level (so-called dark output level) of the pixel signals after the pixel signals are output from the pixels 31 in a non-exposure state and processed by the processing circuit 71. A pixel signal group OP1 illustrated in FIG. 6 shows an example in which the activation ratios of one or both of the TG 80 and the digital gain circuit 90 are less than or equal to a first threshold value. A pixel signal group OP2 shows an example in which the activation ratios of one or both of the TG 80 and the digital gain circuit 90 exceed the first threshold value. As illustrated in FIG. 6, as the activation ratios of the TG 80 and the digital gain circuit 90 are increased, the dark output level of the pixels 31 positioned near the TG 80 and near the digital gain circuit 90 is also increased.

The activation ratio of each of the TG 80 and the digital gain circuit 90 has a correlation with an imaging mode (a difference such as whether to read out the pixels 31 of the pixel unit 30 by thinning out or read out the pixels 31 without thinning out), an operation frequency of the ADC 73 in the processing circuit 71, a resolution of digital conversion set in the ADC 73, a time (hereinafter, referred to as a conversion speed) required for digital conversion set in the ADC 73, or the like. In a case where the operation frequency, the resolution, or the conversion speed of the ADC 73 changes, the activation ratio also changes. Thus, in a case where the operation state (the operation frequency, the resolution, or the conversion speed; or the activation ratio) of the processing circuit 71 changes, the shape of the horizontal shading changes.

In the digital camera 100, a horizontal crop mode can be set as the imaging mode. The horizontal crop mode is a mode in which in each pixel row of the pixel unit 30, the pixel signals are read out from the pixels 31 in a center part in the H direction, and in which the pixel signals are not read out from the pixels 31 in both end parts in the H direction. In the horizontal crop mode, the system control unit 11 controls the processing circuit 71 corresponding to the pixel column 31C from which the pixel signals are not read out, to a state of not being in operation. Consequently, the activation ratio of the digital gain circuit 90 on a rear stage of the processing circuit 71 is decreased, compared to a normal mode in which the pixel signals are read out from all pixels 31 of the pixel row. Accordingly, in the normal mode, for example, the shape of the horizontal shading corresponds to the pixel signal group OP2 in FIG. 6. In the horizontal crop mode, for example, the shape of the horizontal shading corresponds to the pixel signal group OP1 in FIG. 6. Thus, in a case where the operation state of the processing circuit group 70 (a position of the processing circuit 71 that is in operation) changes, the shape of the horizontal shading also changes.

In the imaging element 5C illustrated in FIG. 4, the horizontal shading occurs in any of a state where only one of the processing circuit group 70 and the processing circuit group 70A is in operation, and a state where both of the processing circuit group 70 and the processing circuit group 70A are in operation, as in the imaging element 5A. In a state where both of the processing circuit group 70 and the processing circuit group 70A are operating, for example, the activation ratio of the TG 80 is increased. Thus, for example, the shape of the horizontal shading corresponds to the pixel signal group OP2 in FIG. 6. On the other hand, in a state where only one of the processing circuit group 70 and the processing circuit group 70A is operating, for example, the activation ratio of the TG 80 is decreased. Thus, for example, the shape of the horizontal shading corresponds to the pixel signal group OP1 in FIG. 6. That is, in the imaging element 5C, in a case where the number of processing circuit groups that are in operation out of the processing circuit group 70 and the processing circuit group 70A changes, the shape of the horizontal shading also changes.

In the imaging element 5B illustrated in FIG. 3, the effect received from the magnetic flux generated in a case where the TG 80 and the digital gain circuit 90 operate is different between the pixels 31 arranged near the TG 80 and near the digital gain circuit 90 and the pixels 31 arranged away from the TG 80 and from the digital gain circuit 90. Specifically, the pixels 31 arranged near the TG 80 and near the digital gain circuit 90 receive a relatively strong effect of the magnetic flux. Thus, relatively strong noise is mixed into the pixel signals output from the pixels 31 because of the effect of the magnetic flux. On the other hand, in the pixels 31 positioned away from the TG 80 and from the digital gain circuit 90, since the effect of the magnetic flux is low, noise mixed into the pixel signals output from the pixels 31 is weak.

Accordingly, the pixel signals output from each pixel row of the imaging element 5B have a higher dark output level as the pixels 31 thereof are closer to the center in the H direction. The pixel signals output from each pixel column of the imaging element 5B have a higher dark output level as the pixels 31 thereof are closer to the center in the V direction. That is, in the imaging element 5B, the horizontal shading and vertical shading occur because of the effect of the magnetic flux from the TG 80 and from the digital gain circuit 90. Shapes of the horizontal shading and the vertical shading change depending on the activation ratio of each of the TG 80 and the digital gain circuit 90.

Figure 7:
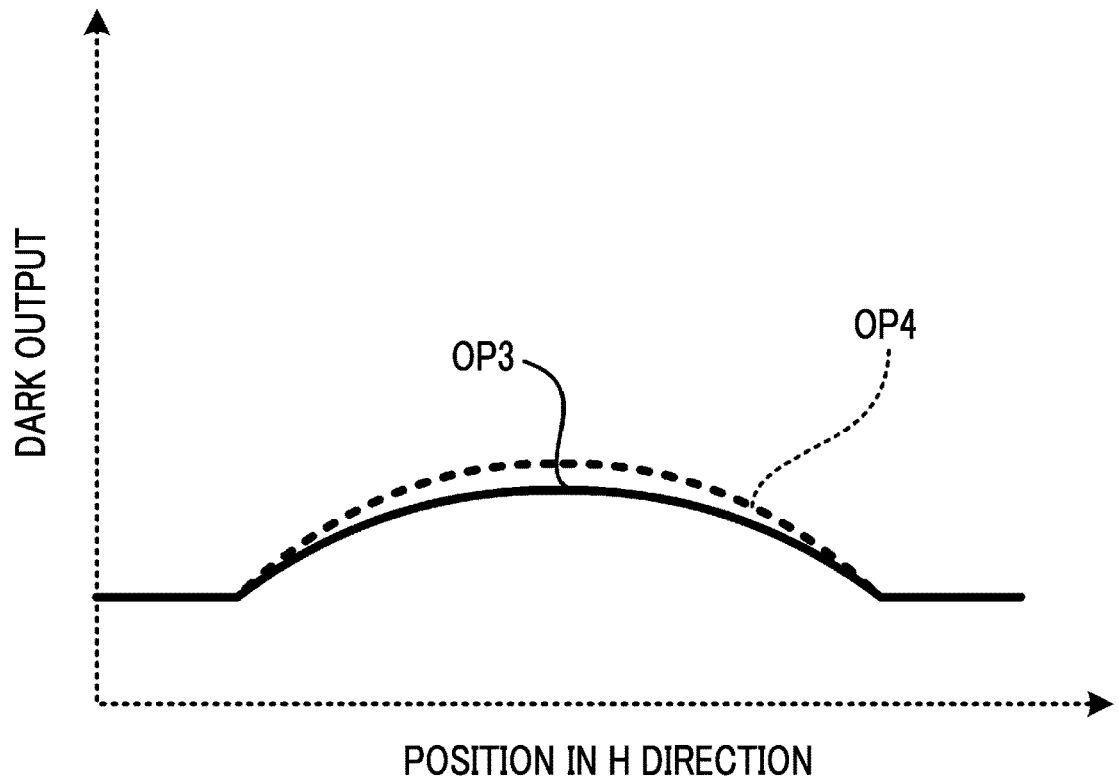
FIG. 7 is a schematic diagram for describing shading of pixel signals output from the imaging element 5B.
Figure 7:
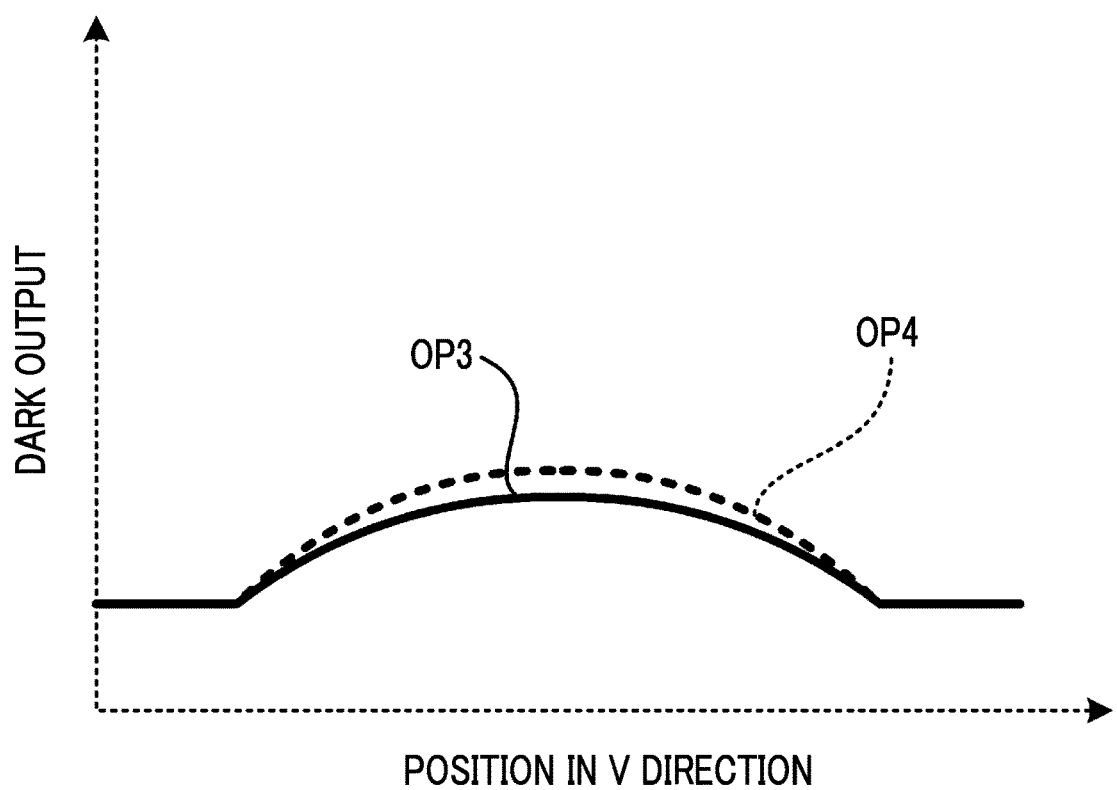

FIG. 7 is a schematic diagram for describing shading of the pixel signals output from the imaging element 5B. The horizontal axis of the graph illustrated in the upper part of FIG. 7 denotes the position of each pixel 31 of the pixel row in the H direction. The horizontal axis of the graph illustrated in the lower part of FIG. 7 denotes the position of each pixel 31 of the pixel column 31C in the V direction. The vertical axis in FIG. 7 denotes the dark output level.

A pixel signal group OP3 illustrated in FIG. 7 shows an example in which the activation ratios of one or both of the TG 80 and the digital gain circuit 90 are less than or equal to the first threshold value. A pixel signal group OP4 shows an example in which the activation ratios of one or both of the TG 80 and the digital gain circuit 90 exceed the first threshold value. As illustrated in FIG. 7, in the imaging element 5B, as the activation ratios of the TG 80 and the digital gain circuit 90 are increased, the dark output level is also increased.

In the imaging element 5D illustrated in FIG. 5, the effect received by each pixel 31 from the magnetic flux occurring in a case where the storage circuit 32 operates is different between a state where the storage circuit 32 is in operation and a state where the storage circuit 32 is not in operation. Specifically, in a state where the storage circuit 32 is in operation, all pixels 31 receive the effect of the magnetic flux. Thus, noise is mixed into the pixel signals output from the pixels 31 because of the effect of the magnetic flux. On the other hand, in a state where the storage circuit 32 is not in operation, there is no effect of the magnetic flux from the storage circuit 32. Thus, noise mixed into the pixel signals output from the pixels 31 is weak.

Figure 8:
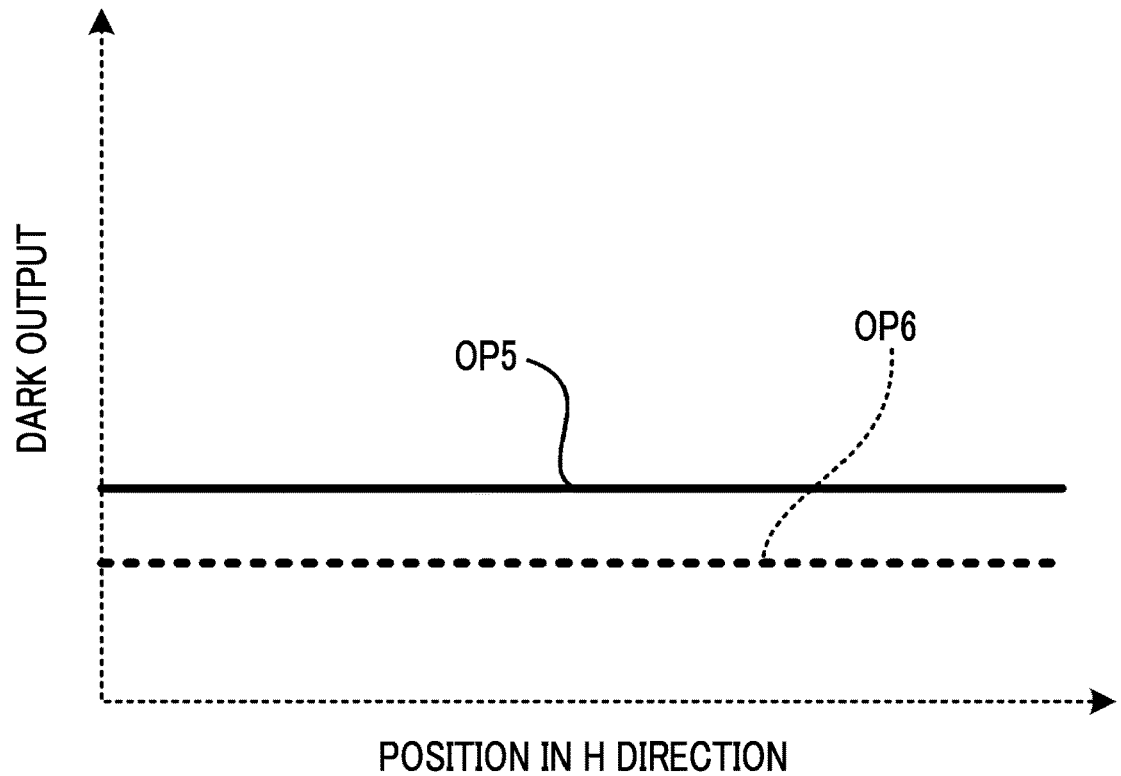
FIG. 8 is a schematic diagram for describing a dark output level of pixel signals output from the imaging element 5D.
Figure 8:
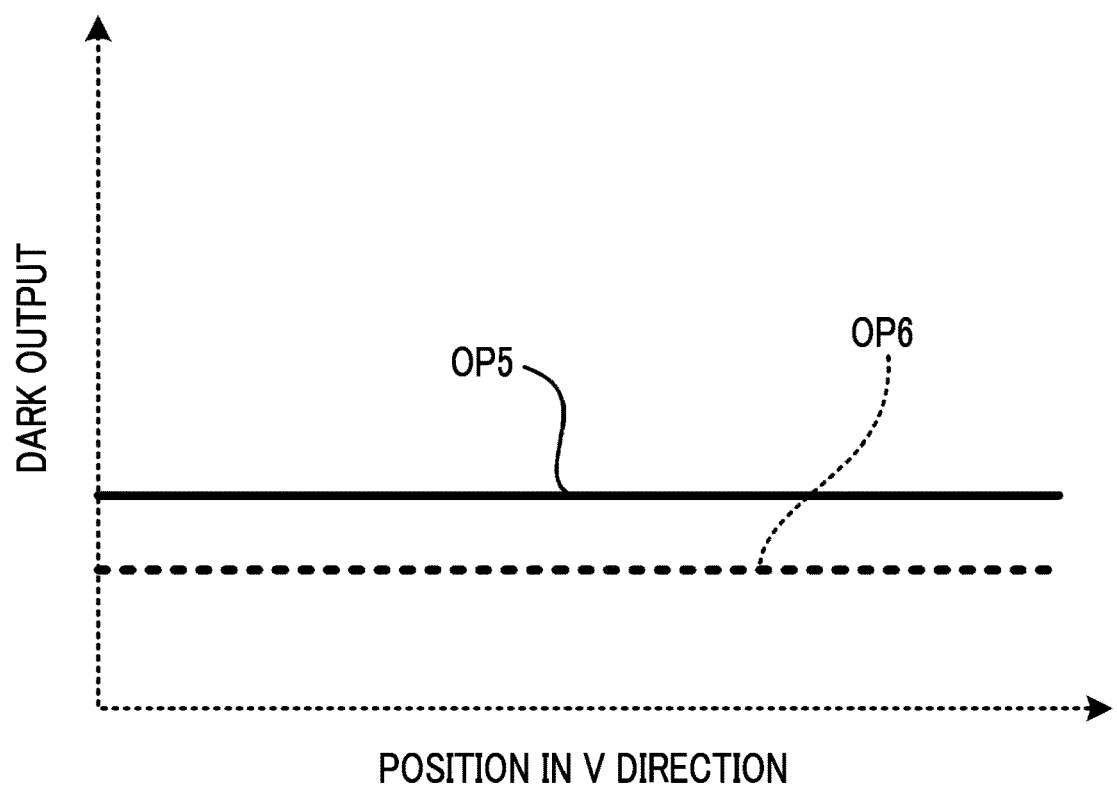

FIG. 8 is a schematic diagram for describing the dark output level of the pixel signals output from the imaging element 5D. The horizontal axis of the graph illustrated in the upper part of FIG. 8 denotes the position of each pixel 31 of the pixel row in the H direction. The horizontal axis of the graph illustrated in the lower part of FIG. 8 denotes the position of each pixel 31 of the pixel column 31C in the V direction. The vertical axis in FIG. 8 denotes the dark output level.

A pixel signal group OP6 illustrated in FIG. 8 shows an example of a state where the storage circuit 32 is not in operation (in other words, a state where the activation ratio of the storage circuit 32 is less than or equal to the threshold value). A pixel signal group OP5 illustrated in FIG. 8 shows an example of a state where the storage circuit 32 is in operation (in other words, a state where the activation ratio of the storage circuit 32 exceeds the threshold value). Thus, in the imaging element 5D, the dark output level also changes depending on the operation state of the storage circuit 32.

Figure 9:
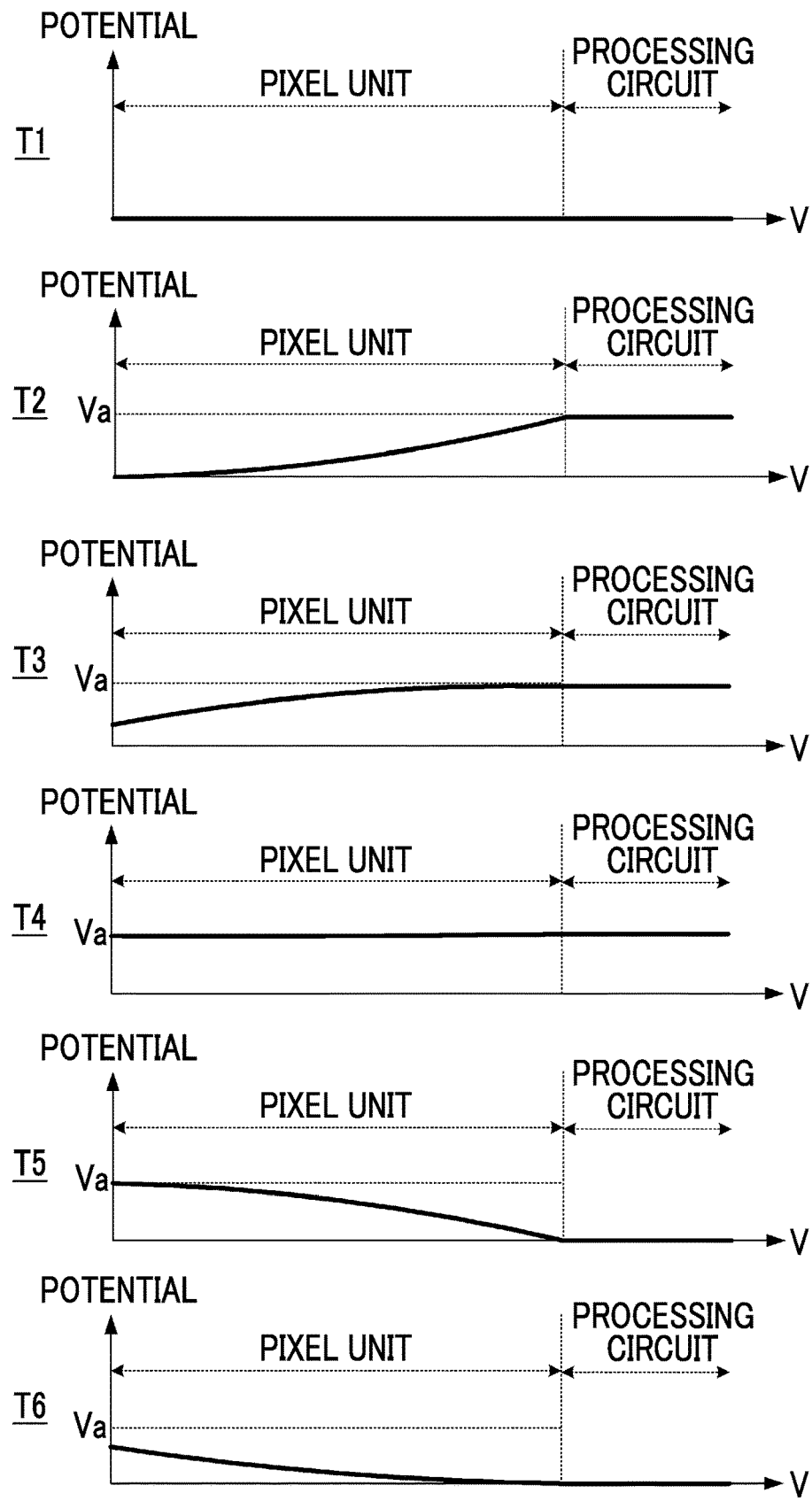
FIG. 9 is a schematic diagram for describing a change in reference potential at a time of operation of the imaging element 5A.

FIG. 9 is a schematic diagram for describing a change in reference potential at a time of operation of the imaging element 5A. The horizontal axis of each graph illustrated in FIG. 9 denotes a position of the imaging element 5A in the V direction. The vertical axis of each graph illustrated in FIG. 9 denotes a potential having a minimum value of, for example, 0 V. The thick solid line of each graph illustrated in FIG. 9 illustrates reference potentials of the pixel unit 30 and the processing circuit 71.

In FIG. 9, a timing T1 to a timing T6 are illustrated as a timing during driving of the imaging element 5A. The timing T1 indicates a state before a drive current is supplied to the pixel unit 30 and to the processing circuit 71 of the imaging element 5A. The timing T2 indicates a state immediately after the drive current is supplied to the pixel unit 30 and to the processing circuit 71 of the imaging element 5A. The timing T3 indicates a state in the middle of reading out the pixel signals after an elapse of a predetermined time from the timing T2. The timing T4 indicates a state in the middle of reading out the pixel signals after an elapse of a predetermined time from the timing T3. The timing T5 indicates a state at a time of start of a vertical blanking period after the timing T4. The timing T6 indicates a state in the middle of the vertical blanking period after an elapse of a predetermined time from the timing T5. A reference terminal connected to the ground is disposed in the imaging element 5A, and a distance between the pixel unit 30 and the reference terminal is set to be longer than a distance between the processing circuit 71 and the reference terminal.

At the timing T2, in a case where the supply of the drive current to the pixel unit 30 and to the processing circuit 71 is started, the reference potential is shifted to a potential Va in the processing circuit 71 located close to the reference terminal. On the other hand, in the pixel unit 30 located away from the reference terminal, while the reference potential is shifted to the potential Va at a location close to the processing circuit 71, a shift amount of the reference potential is decreased in a direction away from the processing circuit 71. In a case where time elapses from the timing T2 to the timing T3, the shift amount of the reference potential in the pixel unit 30 is gradually increased. At the timing T4, the reference potential reaches the potential Va in the entire pixel unit 30.

At the timing T5, in a case where the vertical blanking period is started, the drive current supplied to the pixel unit 30 and to the processing circuit 71 reaches zero, and the reference potential of the processing circuit 71 is decreased to 0 V. In addition, while the reference potential of the pixel unit 30 is decreased to a value close to 0 V at a location close to the processing circuit 71, the reference potential reaches a value close to the potential Va at a location away from the processing circuit 71. In a case where time elapses, the reference potential of the pixel unit 30 is decreased as indicated at the timing T6 and then, is restored to the state indicated at the timing T1.

Thus, the reference potential of the pixel unit 30 changes during a period in which the pixel unit 30 is in operation. In the pixel unit 30, in a case where a change in the reference potential occurs for each location, this causes the vertical shading. The shape of the vertical shading changes depending on a length of the vertical blanking period. That is, in each of the imaging element 5A to the imaging element 5D, the dark output level of the pixels 31 also changes depending on a length of a blanking period of the peripheral circuit 60.

Thus, since the shape of the horizontal shading and the shape of the vertical shading change depending on the operation state of the peripheral circuit 60 in each of the imaging element 5A to the imaging element 5D, it is preferable that correction data for correcting the horizontal shading and the vertical shading in the dark is changed in accordance with the operation state.

Specifically, the system control unit 11 corrects dark non-uniformity (the horizontal shading or the vertical shading, or both thereof) of the imaging signal independently of the operation state of the peripheral circuit 60, by changing a method of correcting (correction of subtracting the dark output level) the pixel signals output from the imaging element 5 based on the operation state of the peripheral circuit 60. Accordingly, quality of the image captured by the imaging element 5 can be increased.

In a case where the imaging element 5 is the imaging element 5A, the system control unit 11 corrects the horizontal shading of the pixel signal group OP1 illustrated in FIG. 6 using first correction data in a case where the activation ratio of the TG 80 or the activation ratio of the digital gain circuit 90 is less than or equal to the first threshold value, and corrects the horizontal shading of the pixel signal group OP2 illustrated in FIG. 6 using second correction data different from the first correction data in a case where the activation ratio of the TG 80 or the activation ratio of the digital gain circuit 90 exceeds the first threshold value.

In a case where the imaging element 5 is the imaging element 5C, the system control unit 11 corrects the horizontal shading of the pixel signal group OP1 illustrated in FIG. 6 using third correction data in a case where one of the processing circuit group 70 and the processing circuit group 70A is in operation, and corrects the horizontal shading of the pixel signal group OP2 illustrated in FIG. 6 using fourth correction data different from the third correction data in a case where both of the processing circuit group 70 and the processing circuit group 70A are in operation.

In a case where the imaging element 5 is the imaging element 5B, the system control unit 11 corrects the horizontal shading and the vertical shading of the pixel signal group OP3 illustrated in FIG. 7 using fifth correction data in a case where the activation ratio of the TG 80 or the activation ratio of the digital gain circuit 90 is less than or equal to the first threshold value, and corrects the horizontal shading and the vertical shading of the pixel signal group OP4 illustrated in FIG. 7 using sixth correction data different from the fifth correction data in a case where both of the processing circuit group 70 and the processing circuit group 70A are in operation.

In a case where the imaging element 5 is the imaging element 5D, the system control unit 11 corrects the pixel signal group OP5 illustrated in FIG. 8 to be zero using seventh correction data in a case where the storage circuit 32 is in operation, and corrects the pixel signal group OP6 illustrated in FIG. 8 to be zero using eighth correction data different from the seventh correction data in a case where the storage circuit 32 is not in operation.

In the case of any of the imaging element 5A to the imaging element 5D, a plurality of pieces of each of the first correction data to the eighth correction data are prepared in accordance with the length of the vertical blanking period. The system control unit 11 performs shading using any of the first correction data to the eighth correction data corresponding to the length of the vertical blanking period.

Thus, according to the digital camera 100, since dark shading is corrected based on the operation state of the peripheral circuit 60, the quality of the captured image can be improved.

Next, a configuration of a smartphone that is another embodiment of the imaging apparatus according to the present invention will be described.

Figure 10:
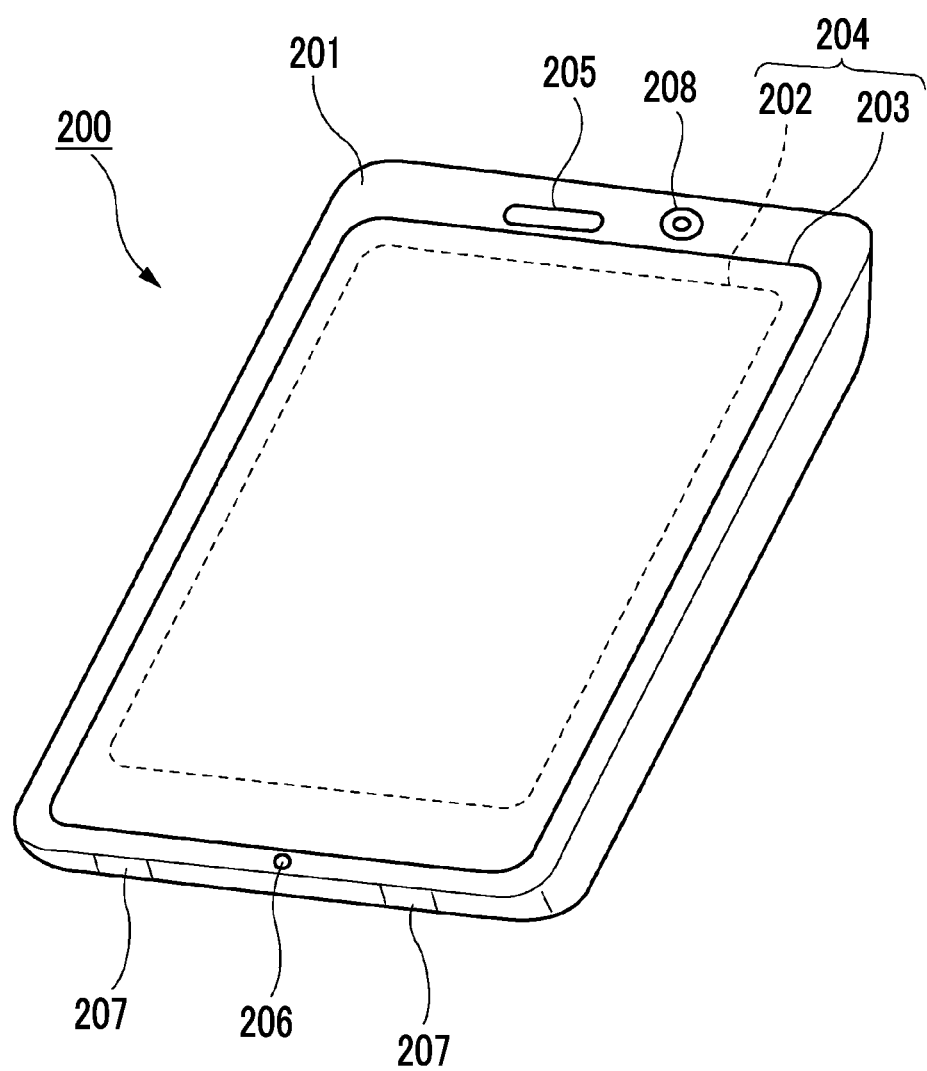
FIG. 10 illustrates an exterior of a smartphone 200.

FIG. 10 illustrates an exterior of a smartphone 200. The smartphone 200 illustrated in FIG. 10 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 11:
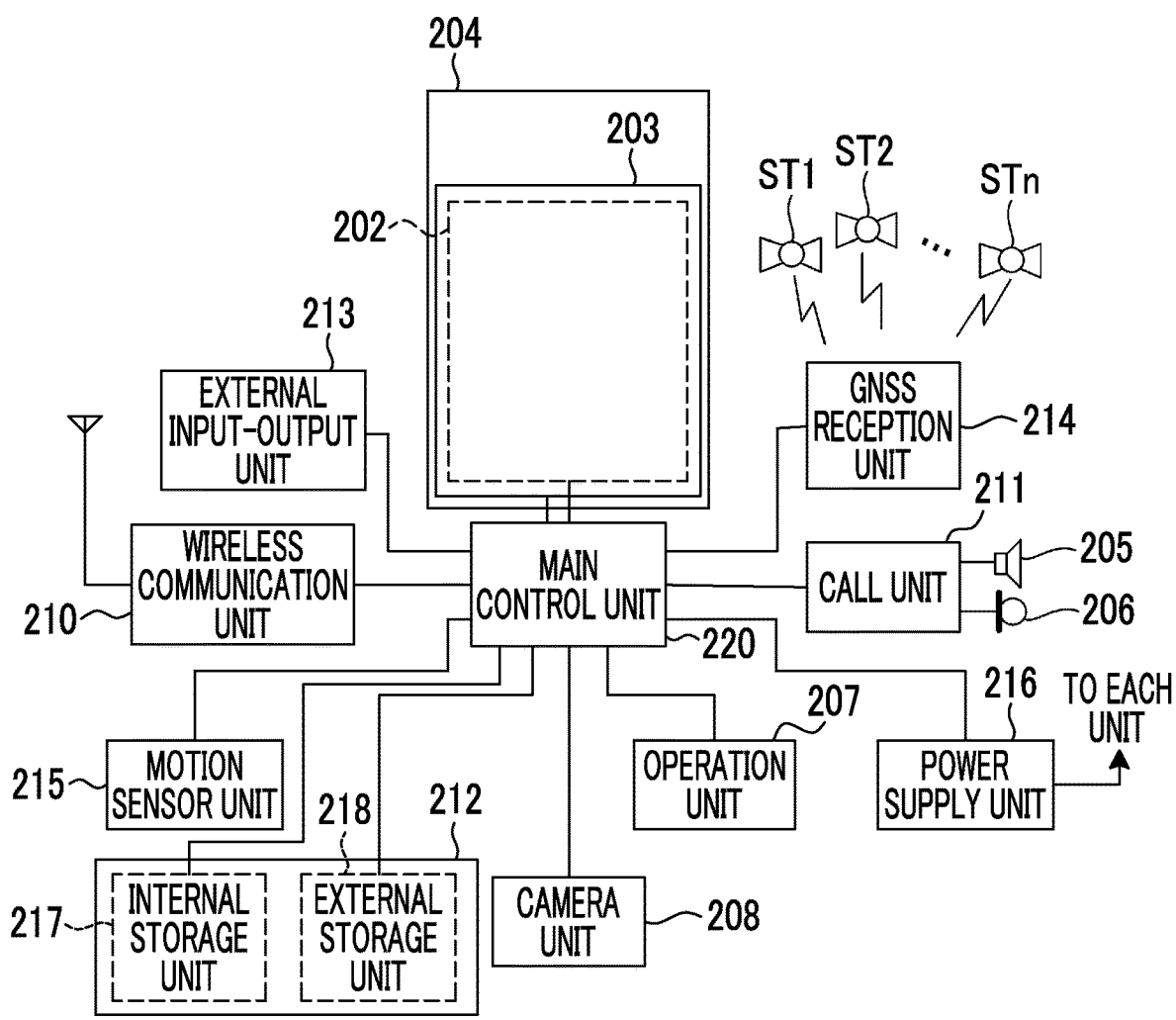
FIG. 11 is a block diagram illustrating a configuration of the smartphone 200 illustrated in FIG. 10.

FIG. 11 is a block diagram illustrating a configuration of the smartphone 200 illustrated in FIG. 10.

As illustrated in FIG. 11, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and that detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on a display surface of the display panel 202 can be visually recognized, and that detects one or a plurality of coordinates operated with a finger of the user or with a stylus. In a case where the device is operated with the finger of the user or with the stylus, a detection signal generated by the operation is output to the main control unit 220. Next, the main control unit 220 detects an operation position (coordinates) on the display panel 202 based on the received detection signal.

As illustrated in FIG. 11, while the display panel 202 and the operation panel 203 of the smartphone 200 are integrated to constitute the display and input unit 204, the operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge portion, other than the overlapping part, that does not overlap with the display panel 202.

A size of the display region and a size of the display panel 202 may completely match, but both sizes do not need to match. In addition, the operation panel 203 may comprise two sensitive regions of the outer edge portion and an inner portion other than the outer edge portion. Furthermore, a width of the outer edge portion is appropriately designed depending on a size and the like of the casing 201.

Furthermore, examples of a position detection method employed in the operation panel 203 include a matrix switch method, a resistive membrane method, a surface acoustic wave method, an infrared method, an electromagnetic induction method, and a capacitance method, and any of the methods can be employed.

The call unit 211 comprises the speaker 205 or the microphone 206, and converts voice of the user input through the microphone 206 into voice data processable in the main control unit 220 and outputs the voice data to the main control unit 220, or decodes voice data received by the wireless communication unit 210 or by the external input-output unit 213 and outputs the decoded voice data from the speaker 205.

In addition, as illustrated in FIG. 10, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 10, the operation unit 207 is a push-button type switch that is mounted on a side surface of the casing 201 of the smartphone 200 and that is set to an ON state in a case where the switch is pressed with the finger or the like, and set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication (for example, Universal Serial Bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, the Ethernet (registered trademark) or through a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation processing based on the plurality of received GNSS signals, and detects a position including a latitude, a longitude, and an altitude of the smartphone 200 in accordance with an instruction from the main control unit 220. In a case where positional information can be acquired from the wireless communication unit 210 or from the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or acceleration of the smartphone 200 is detected. A detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and with the control data stored in the storage unit 212, and manages and controls each unit of the smartphone 200. The microprocessor of the main control unit 220 has the same function as the system control unit 11. In addition, the main control unit 220 has a mobile communication control function for controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of viewing a web page.

In addition, the main control unit 220 has an image processing function such as displaying an image on the display and input unit 204 based on image data (data of a still image or of a motion image) such as reception data or downloaded streaming data.

The image processing function refers to a function of causing the main control unit 220 to decode the image data, perform image processing on the decoding result, and display the image on the display and input unit 204.

Furthermore, the main control unit 220 executes a display control for the display panel 202 and an operation detection control for detecting the user operation through the operation unit 207 and through the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation performed through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 is provided with a touch panel control function of determining whether the operation position on the operation panel 203 is in the overlapping part (display region) overlapping with the display panel 202 or in the other outer edge portion (non-display region) not overlapping with the display panel 202 and of controlling the sensitive region of the operation panel 203 or a display position of the software key.

In addition, the main control unit 220 can detect a gesture operation with respect to the operation panel 203 and execute a function set in advance in accordance with the detected gesture operation.

The gesture operation is not a simple touch operation in the related art and means an operation of drawing a path with the finger or the like, designating a plurality of positions at the same time, or, as a combination thereof, drawing a path for at least one of the plurality of positions.

The camera unit 208 includes the imaging element 5 and the digital signal processing unit 17 in the digital camera illustrated in FIG. 1.

Image data generated by the camera unit 208 can be stored in the storage unit 212 or be output through the external input-output unit 213 or through the wireless communication unit 210.

In the smartphone 200 illustrated in FIG. 10, the camera unit 208 is mounted on the same surface as the display and input unit 204. However, a mounting position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in detecting the position via the GNSS reception unit 214, the position can be detected by referring to the image from the camera unit 208. Furthermore, by referring to the image from the camera unit 208, an optical axis direction of the camera unit 208 of the smartphone 200 can be determined, or the current use environment can be determined without using the three-axis acceleration sensor or by using the three-axis acceleration sensor together. The image from the camera unit 208 can also be used in the application software.

In addition, image data of a still image or of a motion image to which the positional information acquired by the GNSS reception unit 214, voice information (may be text information acquired by performing voice to text conversion via the main control unit or the like) acquired by the microphone 206, posture information acquired by the motion sensor unit 215, or the like is added can be stored in the storage unit 212 or be output through the external input-output unit 213 or through the wireless communication unit 210.

Even in the smartphone 200 having the above configuration, the quality of the captured image can be improved by accurately performing shading correction.

As described above, at least the following matters are disclosed in the present specification. While corresponding constituents and the like in the embodiment are shown in parentheses, the present invention is not limited thereto.

(1) A processing device comprising a processor (system control unit 11) that processes an imaging signal output from an imaging element (imaging element 5 (5A, 5B, 5C, and 5D)) which includes a pixel unit (pixel unit 30) in which a pixel (pixel 31) which converts light into an electric signal and which outputs the electric signal is arranged, and which includes a peripheral circuit (peripheral circuit 60), and a memory (memory 16), in which the processor is configured to correct the imaging signal based on an operation state of the peripheral circuit.

(2) The processing device according to (1), in which the processor is configured to change a correction method of the imaging signal based on the operation state of the peripheral circuit.

(3) The processing device according to (1) or (2), in which the processor is configured to change correction data to be used for correcting the imaging signal based on the operation state of the peripheral circuit.

(4) The processing device according to any one of (1) to (3), in which the operation state of the peripheral circuit is an activation ratio of the peripheral circuit.

(5) The processing device according to any one of (1) to (4), in which the peripheral circuit includes a processing circuit (processing circuit 71) that processes an output signal of the pixel and that outputs the output signal as the digital imaging signal.

(6) The processing device according to (5), in which the peripheral circuit includes a processing circuit group (processing circuit group 70) in which a plurality of the processing circuits are arranged in one direction (H direction), and the processor is configured to change a correction method of the imaging signal based on a position of the processing circuit that is in operation in the processing circuit group.

(7) The processing device according to (5) or (6), in which the peripheral circuit includes a plurality of processing circuit groups in each of which a plurality of the processing circuits are arranged in one direction, and the processor is configured to change a correction method of the imaging signal based on the number of processing circuit groups that are in operation among the plurality of processing circuit groups (processing circuit groups 70 and 70A).

(8) The processing device according to any one of (5) to (7), in which the processor is configured to change a correction method of the imaging signal based on an operation frequency of the processing circuit.

(9) The processing device according to any one of (1) to (8), in which the peripheral circuit includes a conversion circuit (ADC 73) that converts an analog output signal output from the pixel into a digital signal.

(10) The processing device according to (9), in which the operation state of the peripheral circuit includes an activation ratio of a circuit (digital gain circuit 90) that performs processing on an output of the conversion circuit.

(11) The processing device according to (9) or (10), in which the processor is configured to change a correction method of the imaging signal based on a resolution set in the conversion circuit.

(12) The processing device according to any one of (9) to (11), in which the processor is configured to change a correction method of the imaging signal based on a time required for digital conversion in the conversion circuit.

(13) The processing device according to any one of (1) to (12), in which the processor is configured to change a correction method of the imaging signal based on a length of a blanking period of the peripheral circuit.

(14) The processing device according to any one of (1) to (13), in which the peripheral circuit includes a storage circuit (storage circuit 32) that stores an output signal of the pixel unit.

(15) The processing device according to (14), in which the processor is configured to change a correction method of the imaging signal between a time of the storage circuit in operation and a time of the storage circuit not in operation.

(16) The processing device according to any one of (1) to (15), in which the correction is dark non-uniformity correction.

(17) An imaging apparatus (digital camera 100) comprising the processing device according to any one of (1) to (16), and the imaging element.

(18) A processing method for processing an imaging signal output from an imaging element which includes a pixel unit in which a pixel which converts light into an electric signal and which outputs the electric signal is arranged, and which includes a peripheral circuit, the processing method comprising correcting the imaging signal based on an operation state of the peripheral circuit.

(19) A processing program for processing an imaging signal output from an imaging element which includes a pixel unit in which a pixel which converts light into an electric signal and which outputs the electric signal is arranged, and which includes a peripheral circuit, the processing program causing a processor to execute correcting the imaging signal based on an operation state of the peripheral circuit.

EXPLANATION OF REFERENCES

1: imaging lens
OP1 to OP6: pixel signal group
T1 to T6: timing
4: lens control unit
5A, 5B, 5C, 5D, 5: imaging element
8: lens drive unit
9: stop drive unit
11: system control unit
14, 207: operation unit
15: memory control unit
16: memory
17: digital signal processing unit
20: external memory control unit
21: recording medium
22a: display controller
22b: display surface
22: display device
24: control bus
25: data bus
30: pixel unit
31C: pixel column
31: pixel
32: storage circuit
40: lens device
60: peripheral circuit
70A, 70: processing circuit group
71: processing circuit
72: CDS circuit
73: ADC
80: TG
90A, 90: digital gain circuit
100A: main body unit
100: digital camera
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit

What is claimed is:

1. A processing device comprising:
a processor that processes an imaging signal output from an imaging element which includes a peripheral circuit and a pixel unit in which a pixel which converts light into an electric signal and outputs the electric signal is arranged; and
a memory,
wherein the processor is configured to:
correct the imaging signal based on an operation state of the peripheral circuit, the peripheral circuit includes a processing circuit that processes an output signal of the pixel and outputs the processed output signal as the imaging signal which is digital, the peripheral circuit includes a plurality of processing circuit groups, and the processor is configured to:
   change a correction method of the imaging signal based on number of the processing circuit groups that are in operation among the plurality of processing circuit groups.

2. The processing device according to claim 1, wherein the processor is configured to:
   change a correction method of the imaging signal based on the operation state of the peripheral circuit.

3. The processing device according to claim 1, wherein the processor is configured to:
   change correction data to be used for correcting the imaging signal based on the operation state of the peripheral circuit.

4. The processing device according to claim 1, wherein the operation state of the peripheral circuit is an activation ratio of the peripheral circuit.

5. The processing device according to claim 1, wherein the peripheral circuit includes a processing circuit group in which a plurality of the processing circuits are arranged in one direction, and the processor is configured to:
   change a correction method of the imaging signal based on a position of the processing circuit that is in operation in the processing circuit group.

6. The processing device according to claim 1, wherein the processor is configured to:
   change a correction method of the imaging signal based on an operation frequency of the processing circuit.

7. The processing device according to claim 1, wherein the peripheral circuit includes a conversion circuit that converts an analog output signal output from the pixel into a digital signal.

8. The processing device according to claim 7, wherein the operation state of the peripheral circuit includes an activation ratio of a circuit that performs processing on an output of the conversion circuit.

9. The processing device according to claim 7, wherein the processor is configured to:
   change a correction method of the imaging signal based on a resolution set in the conversion circuit.

10. The processing device according to claim 7, wherein the processor is configured to:
    change a correction method of the imaging signal based on a time required for digital conversion in the conversion circuit.

11. The processing device according to claim 1, wherein the processor is configured to:
    change a correction method of the imaging signal based on a length of a blanking period of the peripheral circuit.

12. The processing device according to claim 1, wherein the peripheral circuit includes a storage circuit that stores an output signal of the pixel unit.

13. The processing device according to claim 12, wherein the processor is configured to:
    change a correction method of the imaging signal between a time of the storage circuit in operation and a time of the storage circuit not in operation.

14. The processing device according to claim 1, wherein the correction is a non-uniformity correction in darkness.

15. An imaging apparatus comprising:
    the processing device according to claim 1; and
    the imaging element.

16. A processing method for processing an imaging signal output from an imaging element which includes a peripheral circuit and a pixel unit in which a pixel which converts light into an electric signal and outputs the electric signal is arranged, the peripheral circuit includes a processing circuit that processes an output signal of the pixel and outputs the processed output signal as the imaging signal which is digital, and the peripheral circuit includes a plurality of processing circuit groups, the processing method comprising:
    correcting the imaging signal based on an operation state of the peripheral circuit; and
    changing a correction method of the imaging signal based on number of the processing circuit groups that are in operation among the plurality of processing circuit groups.

17. A non-transitory computer readable medium storing a processing program for processing an imaging signal output from an imaging element which includes a peripheral circuit and a pixel unit in which a pixel which converts light into an electric signal and which outputs the electric signal is arranged, the peripheral circuit includes a processing circuit that processes an output signal of the pixel and outputs the processed output signal as the imaging signal which is digital, and the peripheral circuit includes a plurality of processing circuit groups, the processing program causing a processor to execute:
    correcting the imaging signal based on an operation state of the peripheral circuit;
    changing a correction method of the imaging signal based on number of the processing circuit groups that are in operation among the plurality of processing circuit groups.

* * * * *